June 2, 1970  S. A. CLAYPOOLE ET AL  3,515,958
ELECTRICAL COMPONENT WITH ATTACHED LEADS
Original Filed Nov. 5, 1965
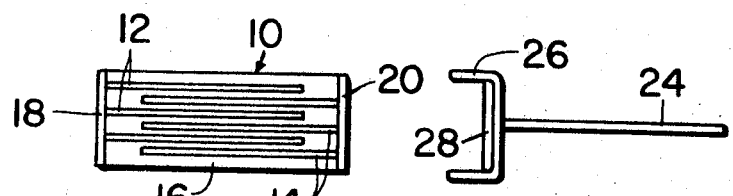
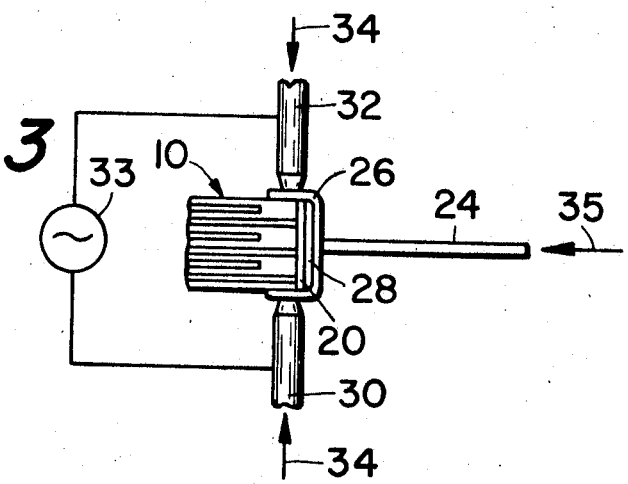
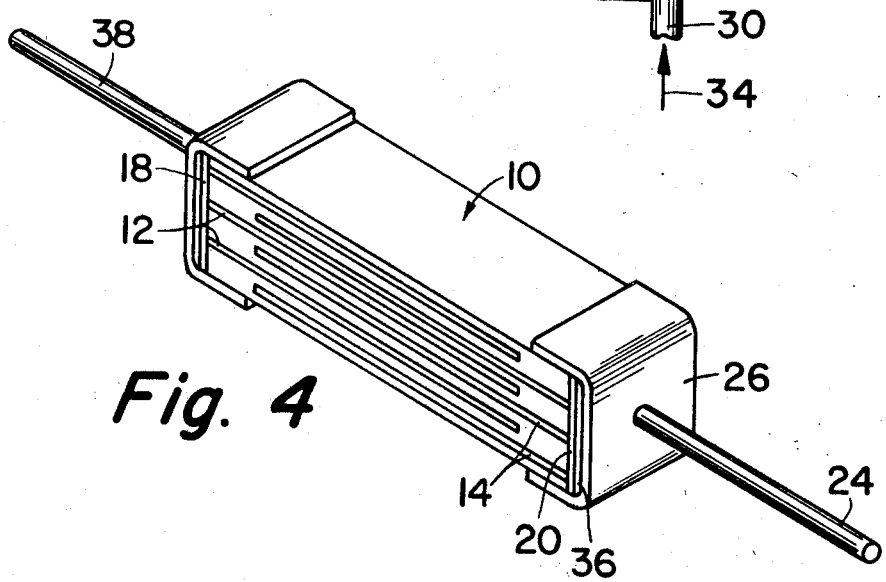
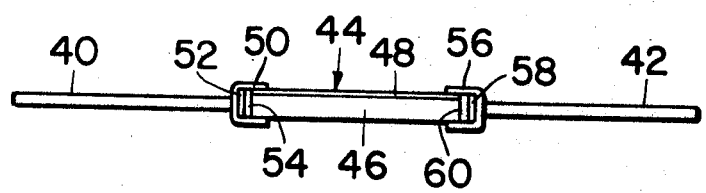
INVENTORS.
Stewart A. Claypoole
Martin M. Mertsoc
BY
*Walter S. Zebrowski*
ATTORNEY

United States Patent Office 3,515,958
Patented June 2, 1970

1

3,515,958
ELECTRICAL COMPONENT WITH ATTACHED LEADS
Stewart A. Claypoole, Painted Post, and Martin M. Mertsoc, Corning, N.Y., assignors to Corning Glass Works, Corning, N.Y., a corporation of New York
Original application Nov. 5, 1965, Ser. No. 506,510, now Patent No. 3,439,395, dated Apr. 22, 1969. Divided and this application Nov. 4, 1968, Ser. No. 773,177
Int. Cl. H01g 1/14
U.S. Cl. 317—242          4 Claims

ABSTRACT OF THE DISCLOSURE

An electrical element to which a lead assembly having a wire lead and a U-shaped terminal is attached. A bond between the terminal and the end of the element comprises a metallic coating fired onto the end of the lead and a bonding medium fused to the coating and the terminal.

CROSS REFERENCE TO RELATED APPLICATIONS

This application is a division of co-pending U.S. patent application Ser. No. 506,510, filed Nov. 5, 1965, now Pat. 3,439,395 issued Apr. 22, 1969.

BACKGROUND OF THE INVENTION

For simplicity, the present invention shall be described in terms of attaching leads to a stacked capacitor the preferred embodiment, however, it is to be clearly understood that this invention is in no way limited to capacitors.

As is known in the art, stacked capacitors consist of alternate layers of conductive plates such as metallic foils, sheets, or films, and dielectric material such as glass. Alternative conductive plates extend to or project slightly beyond one end of the dielectric layers while the remaining plates extend to or project slightly beyond the other end of the dielectric layers. One lead is attached to each end of the capacitor in contact with one set of capacitor plates. The capacitors are then encased within some dielectric material so that only the leads project beyond the case body.

Heretofore, leads have been attached to such capacitors directly by means of soft solder, resistance welding, conductive frit and the like. Such methods have proved unsatisfactory since the leads did not have a strong mechanical bond to the capacitor, did not provide good electrical continuity between the leads and the plates, required the plates to extend beyond the ends of the capacitor element, or the like.

SUMMARY OF THE INVENTION

The objects of the present invention are to provide an economical electrical component where leads are attached thereto in such manner that they provide a strong mechanical bond to the component body and so that there is good electrical continuity between the leads and the component element.

Broadly according to this invention leads may be attached to an electrical component by providing a lead assembly having a wire lead and a U-shaped terminal at one end thereof with the enclosed portion of the terminal extending away from the wire lead, applying a

2 fusible bonding medium to the back surface of the enclosed portion of said terminal, applying a metallic coating to the end of the electrical component in electrical contact with the end of the electrical element, disposing the terminal about the end of the electrical component with the fusible bonding medium in contact with the metallic coating, and thereafter heating the terminal by passing electrical energy therethrough thereby fusibly uniting the terminal to the component end.

Additional objects, features, and advantages of the present invention will become apparent to those skilled in the art, from the following detailed description and the attached drawing on which, by way of example, only the preferred embodiments of this invention are illustrated.

BRIEF DESCRIPTION OF THE DRAWINGS

FIG. 1 is a side elevation of a capacitor body, to the ends of which a metallic film has been applied.

FIG. 2 is a side elevation of a coated lead assembly of the present invention.

FIG. 3 is a side elevation of a stacked capacitor, to the end of which a lead assembly is being attached in accordance with the present invention.

FIG. 4 is an oblique view illustrating a capacitor having leads attached according to the present invention.

FIG. 5 is a side elevation of a resistor to which leads have been attached in accordance with the present invention.

DESCRIPTION OF THE PREFERRED EMBODIMENTS

Referring to FIG. 1, a stacked capacitor body 10 is shown having two sets of capacitor plates 12 and 14 embedded in a mass of glass dielectric material 16. Such a capacitor body may be formed by assembling alternate layers of metallic foil and thin sheets of glass, and thereafter fusing the assembly to form a monolithic structure. Capacitor plates 12 extend to one end of body 10 while plates 14 extend to the other end. A metallic film 18 is applied to one end of the capacitor body in electrical contact with capacitor plates 12. Metallic film 20 is applied to the other end of the capacitor body in electrical contact with capacitor plates 14.

Suitable metallic films may be formed of silver, gold, platinum, silver-rhodium, palladium, or the like and may be applied by painting, dipping silk screening, spraying, evaporating or the like. A particularly suitable material is a silver-rhodium resinate having 22.5 percent by weight silver and 0.15 percent by weight rhodium.

A lead assembly having a wire lead 24 and a U-shaped terminal 26 at one end of lead 24, is formed as shown in FIG. 2. The wire lead is attached to the back portion of the U so that the enclosed portion of terminal 26 extends away from lead 24. A coating 28, of a fusible bonding medium, is applied to the back surface of the enclosed portion. The bonding medium may be a solder, conductive frit, or the like.

A conductive frit is applied as a slurry and is thereafter dried. Such a frit consists of a glass binder mixed intimately with silver particles. A slurry that has particular utility for this invention is one that has a binder particle size such that the particles pass through a 200 mesh screen. The solid constituents have 50 to 90 percent by weight of silver and 10 to 50 percent by weight of fritted glass of the type shown in Example 1 of Table 1.

To form a slurry, about one gram of an organic vehicle such as nitro cellulose amyl acetate solution, turpentine, or the like is added to about 2 to 6 grams of solid constituents. Examples of suitable glass compositions are shown in Table 1 in weight percent.

TABLE 1

|  | Examples | | |
|---|---|---|---|
|  | 1 | 2 | 3 |
| $SiO_2$ | 5 | 15 | 3 |
| $Al_2O_3$ | 5 | 10 | 11 |
| $B_2O_3$ | 30 | 30 | 11 |
| PbO | 60 | 45 | 75 |

Suitable materials for the wire lead are iron-nickel alloys such as Dumet or Kovar, while the terminal can also be formed of iron-nickel alloys such as 54 percent iron and 46 percent nickel.

Referring now to FIG. 3, the lead assembly of FIG. 2 is disposed over the coated end of capacitor body 10 such that the back surface of the terminal coated with the fusible bonding medium contacts the metallic film on the end of the capacitor body. The assembly so formed is then placed between a pair of electrodes 30 and 32 which are connected to a suitable source of electrical energy 33. A force is applied to the assembly by the electrodes in the direction of arrows 34 and a force is also applied along the longitudinal axis in the direction of arrow 35 to keep the fusible bonding medium in contact with the metallic film as current passes through the terminal. The terminal is thus heated causing the fusible bonding medium to fuse to the metallic coating.

The completed capacitor is shown in FIG. 4. Terminal 26 is shown fused to capacitor body 10 and there is good electrical contact between lead 24 and plates 14 through terminal 26, fused bonding medium 36, and metallic coating 20. Lead 38 is similarly attached to the other end of the capacitor.

FIG. 5 illustrates another embodiment of this invention. Leads 40 and 42 are attached to a thin film resistor 44. Resistor 44 comprises a dielectric substrate 46 and a resistance film 48. Lead 40 is attached by means of terminal 50 through fused bonding medium 52 and metallic film 54, while lead 42 is attached by means of terminal 56 through fused bonding medium 58 and metallic film 60.

A typical example of the present invention is illustrated by the following. A stacked capacitor is formed by assembling alternate layers of metallic foil and thin sheets of glass, and thereafter fusing the assembly to form a monolithic structure. One set of capacitor plates extends to one end of the capacitor while the other set extends to the other end.

A film of silver-rhodium resinate having 22.5 percent by weight silver and 0.15 percent by weight rhodium was applied to the ends of the capacitor. The film was thereafter dried and fired forming a metallic coating over each end of the capacitor in electrical contact with each respective set of plates.

A conductive frit composed of three parts by weight of finely divided solid constituents and one part by weight of nitro cellulose amyl acetate solution was then formed. The solid constituents were composed of 70 percent by weight of silver and 30 percent by weight of glass consisting by weight of about 15 percent $SiO_2$, 10 percent $Al_2O_3$, 30 percent $B_2O_3$, and 45 percent PbO.

A lead assembly was provided having a wire lead and a U-shaped terminal attached to the end thereof with the enclosed portion of the terminal extending away from the lead. A coating of the conductive frit was applied to the back surface of the enclosed surfaces of the terminal and thereafter dried. The terminal was formed of an alloy of 54 percent iron and 46 percent nickel.

The terminal was placed over one end of the capacitor with the conductive frit on the terminal in contact with the metallic film on one end of the capacitor. A pair of electrodes were brought into contact with the legs of the U-shaped terminal and electrical energy was passed therethrough thereby heating the terminal and fusing the conductive frit to the metallic coating and the terminal.

It was found that the capacitor had leads strongly bonded to the capacitor body and that there was good electrical continuity between the leads and the component.

It should also be noted that the fusible bonding medium may be applied to both the enclosed surfaces of the terminal as well as over the metallized end of the electrical component when desired. The fusible bonding medium may be applied to all of the surfaces of the enclosed portion of the terminal rather than the back surface alone.

Although the present invention has been described with respect to specific details of certain embodiments thereof, it is not intended that such details be limitations upon the scope of the invention except insofar as set forth in the following claims.

We claim:
1. An electrical component comprising
   an electrical element,
   a lead assembly having a wire lead with an attached U-shaped terminal, the enclosed portion of said terminal being disposed over one end of said element, and
   a bond between said terminal and said end of said element comprising a metallic coating fired onto the end of said element in electrical contact therewith and a conductive frit disposed between and fused to said coating and said terminal.

2. The component of claim 1 wherein said element is a capacitive element.

3. The component of claim 1 wherein the conductive frit consists essentially of 50 to 90 percent by weight of metallic silver and 10 to 50 percent by weight of glass.

4. The component of claim 1 wherein the conductive frit comprises 50 to 90 percent by weight of silver and 10 to 50 percent by weight of glass consisting essentially by weight of about 15 percent $SiO_2$, 10 percent $Al_2O_3$, 30 percent $B_2O_3$, and 45 percent PbO.

References Cited

UNITED STATES PATENTS

| 2,708,701 | 5/1955 | Viola | 338—332 |
| 2,695,275 | 11/1954 | Gray | 317—258 X |

FOREIGN PATENTS

| 806,266 | 3/1951 | Germany. |
| 351,809 | 1837 | Italy. |

E. A. GOLDBERG, Primary Examiner

U.S. Cl. X.R.

317—261; 338—329, 332